United States Patent
McKinley et al.

(10) Patent No.: US 10,372,847 B2
(45) Date of Patent: Aug. 6, 2019

(54) SYSTEMS AND METHODS TO INTEGRATE POWER PRODUCTION SIMULATION WITH POWER DISTRIBUTION SIMULATION

(71) Applicant: General Electric Company, Schenectady, NY (US)

(72) Inventors: Marc Harold McKinley, Roanoke, VA (US); Brian Thomas, Rexford, NY (US); Sajjad Mahmood, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 427 days.

(21) Appl. No.: 15/201,003

(22) Filed: Jul. 1, 2016

(65) Prior Publication Data

US 2018/0004867 A1   Jan. 4, 2018

(51) Int. Cl.
  *G06F 17/50* (2006.01)
  *G06Q 10/04* (2012.01)
  *G06Q 50/06* (2012.01)

(52) U.S. Cl.
  CPC ...... *G06F 17/5009* (2013.01); *G06F 17/5036* (2013.01); *G06Q 10/04* (2013.01); *G06Q 50/06* (2013.01); *G06F 2217/78* (2013.01)

(58) Field of Classification Search
  CPC .................................................. G06F 2217/78
  USPC ........................................................ 703/18
  See application file for complete search history.

(56) References Cited

U.S. PATENT DOCUMENTS

| | | | | | |
|---|---|---|---|---|---|
| 4,341,345 | A | * | 7/1982 | Hammer | F25D 29/00 165/257 |
| 5,386,459 | A | * | 1/1995 | Veeneman | H04M 1/2477 379/201.03 |
| 2009/0271169 | A1 | * | 10/2009 | Minto | G09B 9/00 703/18 |
| 2012/0029720 | A1 | * | 2/2012 | Cherian | H02J 13/00 700/297 |
| 2016/0048150 | A1 | * | 2/2016 | Chiang | G05F 1/66 700/295 |
| 2016/0299999 | A1 | * | 10/2016 | James | G06F 17/5009 |

FOREIGN PATENT DOCUMENTS

| | | | |
|---|---|---|---|
| CN | 102122136 | A * | 7/2011 |
| CN | 102999674 | A * | 3/2013 |
| WO | 2014/056558 | A1 | 4/2014 |

OTHER PUBLICATIONS

C. Descamps, Efficiency of an Integrated Gasification Combined Cycle (IGCC) power plant including CO2 removal, (Year: 2006).*

(Continued)

*Primary Examiner* — Lechi Truong
(74) *Attorney, Agent, or Firm* — Fletcher Yoder, P.C.

(57) ABSTRACT

In one embodiment, a system includes a processor. The processor is configured to provide for time synchronization between execution of a power production modeling and simulation system (PPMSS) model and a power distribution modeling and simulation system (PDMSS) model, wherein the PPMSS model comprises a power production system simulation and wherein the PDMSS model comprises a power distribution system simulation.

11 Claims, 5 Drawing Sheets

(56) References Cited

OTHER PUBLICATIONS

Sedghisigarchi, K., and Feliachi, A.,"Dynamic and Transient Analysis of Power Distribution Systems With Fuel Cells-Part II: Control and Stability Enhancement," IEEE Transactions on Energy Conversion, vol. 19, No. 2, pp. 429-434 (Jun. 2004).
Extended European Search Report and Opinion issued in connection with corresponding EP Application No. 17177321.1 dated Oct. 5, 2017.

* cited by examiner

SYSTEMS AND METHODS TO INTEGRATE POWER PRODUCTION SIMULATION WITH POWER DISTRIBUTION SIMULATION

BACKGROUND OF THE INVENTION

The subject matter disclosed herein relates to power production simulation and power distribution simulation, and more specifically, the integration of power production simulation with power distribution simulation.

Certain systems may model and simulate power production systems, such as a power production plant, and simulate the resulting power production systems, for example, to validate and verify a new power production plant design. Likewise, certain systems may model and simulate power distribution and/or consumption, such as an electric grid and power consumptive sites electrically coupled to the grid. The power distribution and/or consumption models may be useful, for example, in simulating the transmission of power through a network, and/or the subsequent use of the power. It would be advantageous to integrate systems that model and simulate power productions systems with systems that model and simulate power distribution and/or consumption systems.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a processor. The processor is configured to provide for time synchronization between execution of a power production modeling and simulation system (PPMSS) model and a power distribution modeling and simulation system (PDMSS) model, wherein the PPMSS model comprises a power production system simulation and wherein the PDMSS model comprises a power distribution system simulation.

In a second embodiment, a method includes executing, via a processor, a simulation integration system configured to provide for time synchronization between execution of a power production modeling and simulation system (PPMSS) model and a power distribution modeling and simulation system (PDMSS) model, wherein the PPMSS model comprises a power production system simulation and wherein the PDMSS model comprises a power distribution system simulation.

In a third embodiment, a tangible, non-transitory, computer-readable medium includes instructions that when executed by a processor cause the processor to execute a simulation integration system configured to provide for time synchronization between execution of a power production modeling and simulation system (PPMSS) model and a power distribution modeling and simulation system (PDMSS) model, wherein the PPMSS model comprises a power production system simulation and wherein the PDMSS model comprises a power distribution system simulation.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
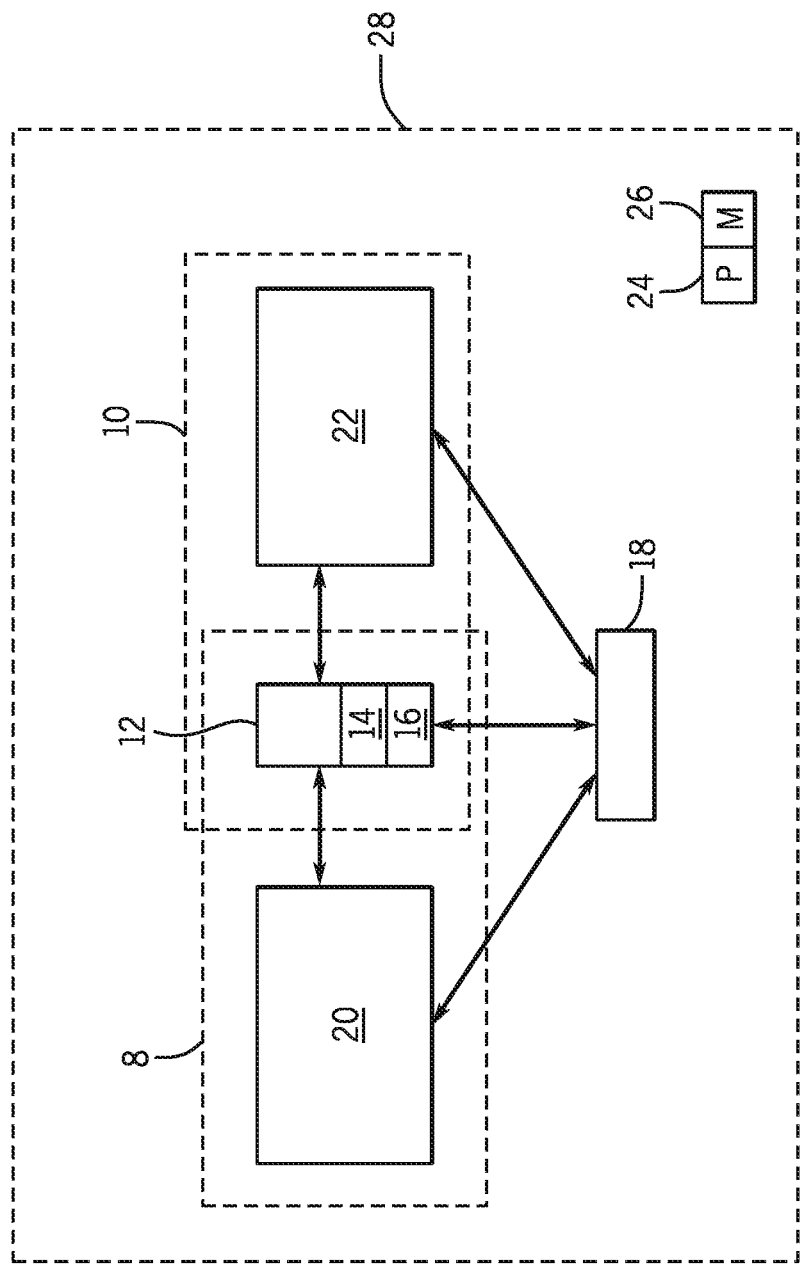
FIG. 1 illustrates an embodiment of a power production modeling and simulation system (PPMSS) operatively coupled to a power distribution modeling and simulation system (PDMSS) via a simulation integration system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The techniques described herein provide for systems and methods that more efficiently integrate systems that include transient models, for example, of power production and generation, with systems that include transient models, for example, of power distribution and/or consumption. In one embodiment, a transient model of power generation and a transient model of power distribution and/or consumption may be integrated via software without being dependent on special hardware, e.g. reflective memory (RFM), to facilitate inter-process communication and time synchronization between both models. The system including the power production and generation model, referred to herein as the power production modeling and simulation system (PPMSS), may act as a master or host, and may control when the system including the power distribution model may execute the power distribution model. The system including the power distribution model is referred to herein as the power distribution modeling and simulation system (PDMSS).

Model execution may refer to an integration of simulation time by a prescribed or pre-configured integration time step. At a high level, during model execution the PDMSS will read inputs, solve state and algebraic equations, and write outputs. The PDMSS will include a smaller time step for numerical integration as compared to the PPMSS. Accordingly, the PDMSS model will run at a higher frequency until simulation time for that execution cycle equates to an integration time step for the PPMSS model, at which time control is relinquished to PPMSS to complete another cycle. A frequency of data exchange is exclusively determined by the integration time step configured in each model. Data exchange may preferably include shared memory exchanges, but other inter process communication (IPC) techniques may also be used, including named pipes, sockets, message passing, message queues, and the like. By providing for the PPMSS master and the smaller time step PDMSS integrated via a simulation integration system, a more reliable and efficient simulation of power production and subsequent power distribution may be enabled.

Turning now to FIG. 1, the figure illustrates an embodiment of a PPMSS 8 operatively coupled to a PDMSS 10 via a simulation integration system 12. In certain embodiments, the simulation integration system 12 may be included in the PPMSS 8. In other embodiments, the simulation integration system 12 may be included in the PDMSS 10. In yet other embodiments, the simulation integration system 12 may be a standalone system, or included in another system not shown. The simulation integration system 12 may further include a library system 14 and a dynamic link library (DLL) system 16. The library system 14 may provide for an application programming interface (API) suitable for interfacing between the PPMSS 8 and the PDMSS 10. For example, the API may expose certain functions, subroutines, programming interfaces, system calls (e.g., operating system functions and/or subroutines), constants, and the like, useful in exchanging data between the PPMSS 8 and the PDMSS 10, as further described below. The DLL system 16 may include executable code or instructions that may be loaded, for example, at runtime, by the PPMSS 8 and/or the PDMSS 10 to execute the functions, subroutines, programming interfaces, system calls, constants, and the like, described via the library system 14.

A shared memory system 18 is also illustrated. In operation the PPMSS 8 and the PDMSS 10 may share data via the shared memory system 18. For example, the simulation integration system 12 may mediate between the PPMSS 8 and the PDMSS 10 to update data every simulation integration time step as a simulation advances in time. Data included in the shared memory system 18 may be protected by system locks (mutex) to ensure data integrity. Time synchronization (e.g., handshaking) between models 20, 22 may be facilitated with system (e.g., operating system) events. In a preferred embodiment, the transient model 20 executing within the PPMSS 8 is the master and the transient model 22 executing within the PDMSS 10 is the slave. That is, the transient model 20 determines when to invoke the transient model 22 for further execution. In one embodiment, the transient model 22 executes at a higher frequency when compared to the transient model 20, e.g. the transient model 22 may include an integration time step of 4 ms whereas the transient model 20 may include an integration time step of 2 ms. Accordingly, the model 22 may execute two cycles when compared to the model 20. It is to be noted that other frequencies may be used, for example, such that the model 22 includes a lower integration time step when compared to the model 20.

In the depicted embodiment, the PPMSS 8 system is designed and used to develop large-scale, high-fidelity, transient system models of physical systems or processes typically found in the power industry. Examples of the models 20 may include combined-cycle power plant (CCPP) as well as larger and more complex, integrated gasification combined-cycle power plants (IGCC). These CCPP and/or IGCC systems can be comprised of gas turbines, steam turbines, heat recover steam generators (HRSG), and other types of equipment, e.g. pipes, valves, pumps, vessels, heat exchangers, and the like. In one embodiment, the PPMSS 8 may include Easy5™, available from MSC Software of Newport Beach, Calif., U.S.A. The PDMSS 10 system is designed and used to develop large-scale, high-fidelity, transient system models of electrical systems (e.g., electrical power grids) or processes typically found in the energy industry.

Models 22 may include power flow and stability models that includes integration with geographic information systems (e.g., Google Earth) to provide for analysis useful in detailing the flow of electrical power and the stability of networks delivering the power. Models 22 may include transmission lines, transformers, switching devices, network graphs, and so on, useful in analyzing the transmission and distribution of power. In one embodiment, the PDMSS 10 may include a Positive Sequence Load Flow (PSLF) software, available from General Electric International Inc., of Schenectady, N.Y., U.S.A. The PDMSS 10 may apply a PSLF analysis that may include solving certain electrical network systems by using, for example, a Newton-Raphson and Differential Algebraic techniques. The Newton-Raphson technique may find successively better approximations to roots (or zeroes) of a real-valued function x: $f(x)=0$. In FIG. 1, the PPMSS 8 and the PDMSS 10 may be software system that may be executable, for example, by physical processor(s) 24 and stored in a memory 26. The processor(s) 24 and the memory 26 may be included in a computing system 28. For example, the computing system 28 may include a workstation, a laptop, a desktop, a notebook, a tablet, or a cloud-computing system. By integrating the model 20 with the model 22 in a single simulation environment, and by sharing data through the shared memory, a more efficient and higher fidelity simulation of certain power production and power distribution systems may be enabled.

Figure 2:
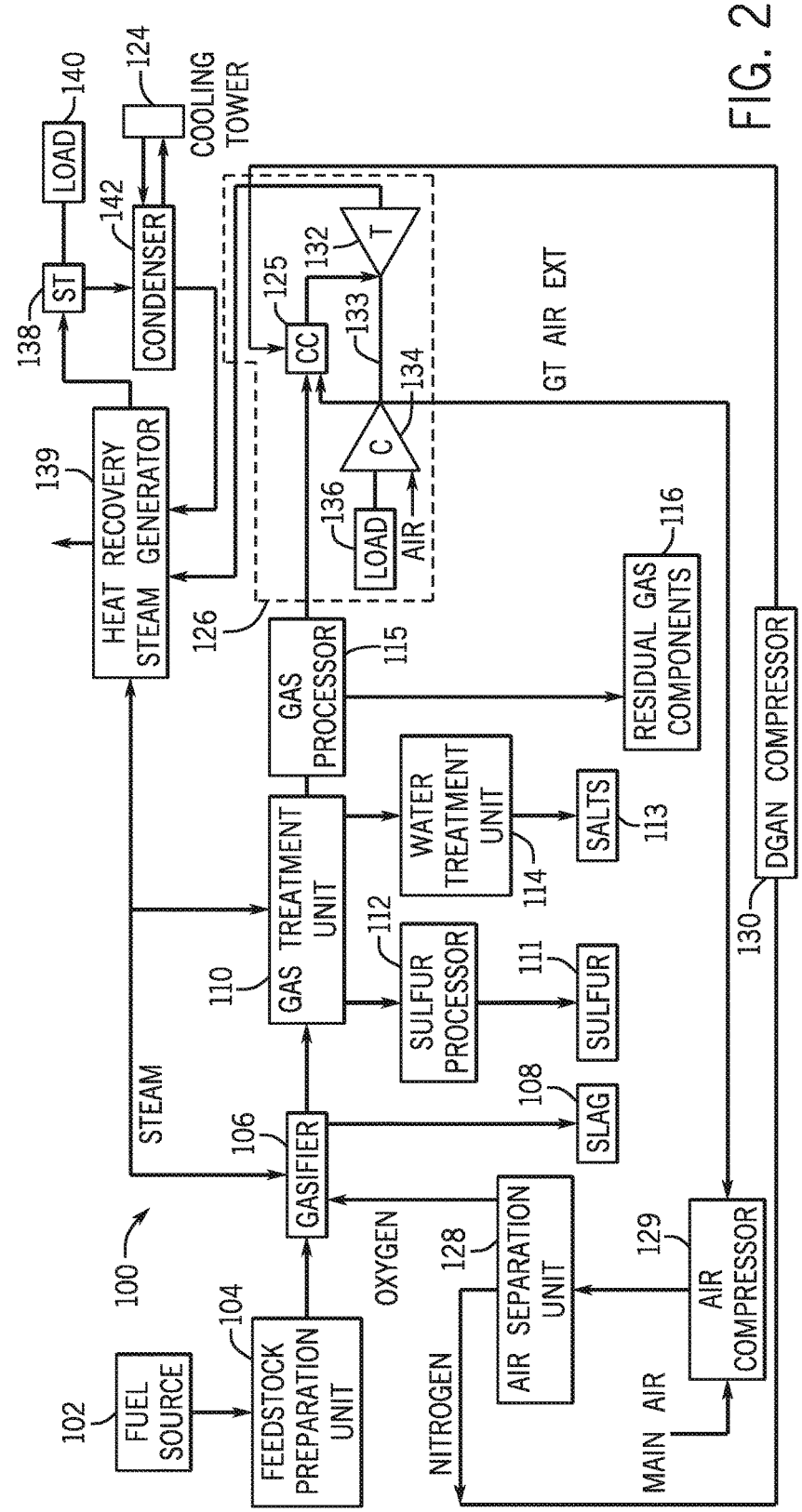
FIG. 2 illustrates an embodiment of an integrated gasification combined cycle (IGCC) power plant system that may be modeled by the PPMSS of FIG. 1.

It may be useful to further describe certain of the systems that may be included in the models 20, 22. Accordingly, FIGS. 2 and 3 describe certain power production and power distribution systems respectively. For example, and turning now to FIG. 2, the figure depicts an embodiment of an IGCC power plant 100 that may be modeled by the model 20. In the depicted embodiment, the IGCC power plant 100 may produce and burn a synthetic gas, i.e., a syngas. Elements of the IGCC power plant 100 may include a fuel source 102, such as a carbonaceous feedstock, that may be utilized as a source of energy for the IGCC power plant 100. The fuel source 102 may include coal, petroleum coke, biomass, wood-based materials, agricultural wastes, tars, oven gas, orimulsion, lignite, and asphalt, or other carbon containing items.

The fuel of the fuel source 102 may be passed to a feedstock preparation unit 104. The feedstock preparation unit 104 may, for example, resize or reshape the fuel source 102 by chopping, milling, shredding, pulverizing, briquetting, or palletizing the fuel source 102 to generate feedstock. Additionally, water, or other suitable liquids may be added to the fuel source 102 in the feedstock preparation unit 104 to create slurry feedstock. In certain embodiments, no liquid is added to the fuel source, thus yielding dry feedstock. The feedstock may be conveyed into a gasifier 106 for use in gasification operations.

The gasifier 106 may convert the feedstock into a syngas, e.g., a combination of carbon monoxide and hydrogen. This conversion may be accomplished by subjecting the feedstock to a controlled amount of any moderator and limited oxygen at elevated pressures (e.g., from approximately 600 pounds per square inch gauge (PSIG)-1200 PSIG) and elevated temperatures (e.g., approximately 2200° F.-2700° F.), depending on the type of feedstock used. The heating of the feedstock during a pyrolysis process may generate a solid (e.g., char) and residue gases (e.g., carbon monoxide, hydrogen, and nitrogen).

A combustion process may then occur in the gasifier 106. The combustion may include introducing oxygen to the char and residue gases. The char and residue gases may react with the oxygen to form $CO_2$ and carbon monoxide (CO), which provides heat for the subsequent gasification reactions. The temperatures during the combustion process may range from approximately 2200° F. to approximately 2700° F. In addition, steam may be introduced into the gasifier 106. The gasifier 106 utilizes steam and limited oxygen to allow some of the feedstock to be burned to produce carbon monoxide and energy, which may drive a second reaction that converts further feedstock to hydrogen and additional carbon dioxide.

In this way, a resultant gas is manufactured by the gasifier 106. This resultant gas may include approximately 85% of carbon monoxide and hydrogen in equal proportions, as well as Argon, $CH_4$, HCl, HF, COS, $NH_3$, HCN, and $H_2S$ (based on the sulfur content of the feedstock). This resultant gas may be termed untreated syngas, since it contains, for example, $H_2S$. The gasifier 106 may also generate waste, such as slag 108, which may be a wet ash material. This slag 108 may be removed from the gasifier 106 and disposed of, for example, as road base or as another building material. To treat the untreated syngas, a gas treatment unit 110 may be utilized. In one embodiment, the gas treatment unit 110 may include one or more water gas shift reactors. The water gas shift reactors may aid in elevating the level of hydrogen ($H_2$) and $CO_2$ in the fuel by converting the CO and $H_2O$ in the syngas into $CO_2$ and $H_2$ (e.g., sour shifting). The gas treatment unit 110 may also scrub the untreated syngas to remove the HCl, HF, COS, HCN, and $H_2S$ from the untreated syngas, which may include separation of sulfur 111 in a sulfur processor 112 component of the gas treatment unit 110. Furthermore, the gas treatment unit 110 may separate salts 113 from the untreated syngas via a water treatment unit 114 that may utilize water purification techniques to generate usable salts 113 from the untreated syngas. Subsequently, the gas from the gas treatment unit 110 may include treated syngas, (e.g., the sulfur 111 has been removed from the syngas), with trace amounts of other chemicals, e.g., $NH_3$ (ammonia) and $CH_4$ (methane).

A gas processor 115 may be used to remove additional residual gas components 116, such as ammonia and methane, as well as methanol or any residual chemicals from the treated syngas. Argon may also be recovered. Argon is a valuable product which may be recovered using, for example, cryogenic techniques. However, removal of residual gas components from the treated syngas is optional, since the treated syngas may be utilized as a fuel even when containing the residual gas components, e.g., tail gas.

The treated syngas may be then transmitted to a combustor 125, e.g., a combustion chamber, of the gas turbine engine 126 as combustible fuel. The IGCC power plant 100 may further include an air separation unit (ASU) 128. The ASU 128 may operate to separate air into component gases by, for example, distillation techniques. The ASU 128 may separate oxygen from the air supplied to it from a supplemental air compressor 129, and the ASU 128 may transfer the separated oxygen to the gasifier 106. Additionally the ASU 128 may transmit separated nitrogen to a diluent nitrogen (DGAN) compressor 130.

The DGAN compressor 130 may compress the nitrogen received from the ASU 128 at least to pressure levels equal to those in the combustor 125, so as not to interfere with the proper combustion of the syngas. Thus, once the DGAN compressor 130 has adequately compressed the nitrogen to a proper level, the DGAN compressor 130 may transmit the compressed nitrogen to the combustor 125 of the gas turbine engine 126. The nitrogen may be used as a diluent to facilitate control of emissions, for example.

As described previously, the compressed nitrogen may be transmitted from the DGAN compressor 130 to the combustor 125 of the gas turbine engine 126. The gas turbine engine 126 may include a turbine 132, a drive shaft 133 and a compressor 134, as well as the combustor 125. The combustor 125 may receive fuel, such as syngas, which may be injected under pressure from fuel nozzles. This fuel may be mixed with compressed air as well as compressed nitrogen from the DGAN compressor 130, and combusted within combustor 125. This combustion may create hot pressurized exhaust gases.

The combustor 125 may direct the exhaust gases towards an exhaust outlet of the turbine 132. As the exhaust gases from the combustor 125 pass through the turbine 132, the exhaust gases force turbine blades in the turbine 132 to rotate the drive shaft 133 along an axis of the gas turbine engine 126. As illustrated, the drive shaft 133 is connected to various components of the gas turbine engine 126, including the compressor 134.

The drive shaft 133 may connect the turbine 132 to the compressor 134 to form a rotor. The compressor 134 may include blades coupled to the drive shaft 133. Thus, rotation of turbine blades in the turbine 132 may cause the drive shaft 133 connecting the turbine 132 to the compressor 134 to rotate blades within the compressor 134. This rotation of blades in the compressor 134 causes the compressor 134 to compress air received via an air intake in the compressor 134. The compressed air may then be fed to the combustor 125 and mixed with fuel and compressed nitrogen to allow for higher efficiency combustion. Drive shaft 133 may also be connected to a load 136, which may be a stationary load, such as an electrical generator for producing electrical power, for example, in a power plant. Indeed, the load 136 may be any suitable device that is powered by the rotational output of the gas turbine engine 126.

The IGCC power plant 100 also may include a steam turbine engine 138 and a heat recovery steam generation (HRSG) system 139. The steam turbine engine 138 may drive a second load 140. The second load 140 may also be an electrical generator for generating electrical power. However, both the first and second loads 136, 140 may be other types of loads capable of being driven by the gas turbine engine 126 and steam turbine engine 138. In addition, although the gas turbine engine 126 and steam turbine engine 138 may drive separate loads 136 and 140, as shown in the illustrated embodiment, the gas turbine engine 126 and steam turbine engine 138 may also be utilized in tandem to drive a single load via a single shaft. The specific configuration of the steam turbine engine 138, as well as the gas turbine engine 126, may be implementation-specific and may include any combination of sections.

The system 100 may also include the HRSG 139. Heated exhaust gas from the gas turbine engine 126 may be transported into the HRSG 139 and used to heat water and produce steam used to power the steam turbine engine 138. Exhaust from, for example, a low-pressure section of the steam turbine engine 138 may be directed into a condenser 142. The condenser 142 may utilize the cooling tower 124 to exchange heated water for chilled water. The cooling tower 124 acts to provide cool water to the condenser 142 to aid in condensing the steam transmitted to the condenser 142 from the steam turbine engine 138. Condensate from the condenser 142 may, in turn, be directed into the HRSG 139. Again, exhaust from the gas turbine engine 126 may also be directed into the HRSG 139 to heat the water from the condenser 142 and produce steam.

In combined cycle power plants such as IGCC power plant 100, hot exhaust may flow from the gas turbine engine 126 and pass to the HRSG 139, where it may be used to generate high-pressure, high-temperature steam. The steam produced by the HRSG 139 may then be passed through the steam turbine engine 138 for power generation. In addition, the produced steam may also be supplied to any other processes where steam may be used, such as to the gasifier 106. The gas turbine engine 126 generation cycle is often referred to as the "topping cycle," whereas the steam turbine engine 126 generation cycle is often referred to as the "bottoming cycle." By combining these two cycles as illustrated in FIG. 1, the IGCC power plant 100 may lead to greater efficiencies in both cycles. In particular, exhaust heat from the topping cycle may be captured and used to generate steam for use in the bottoming cycle.

Figure 3:
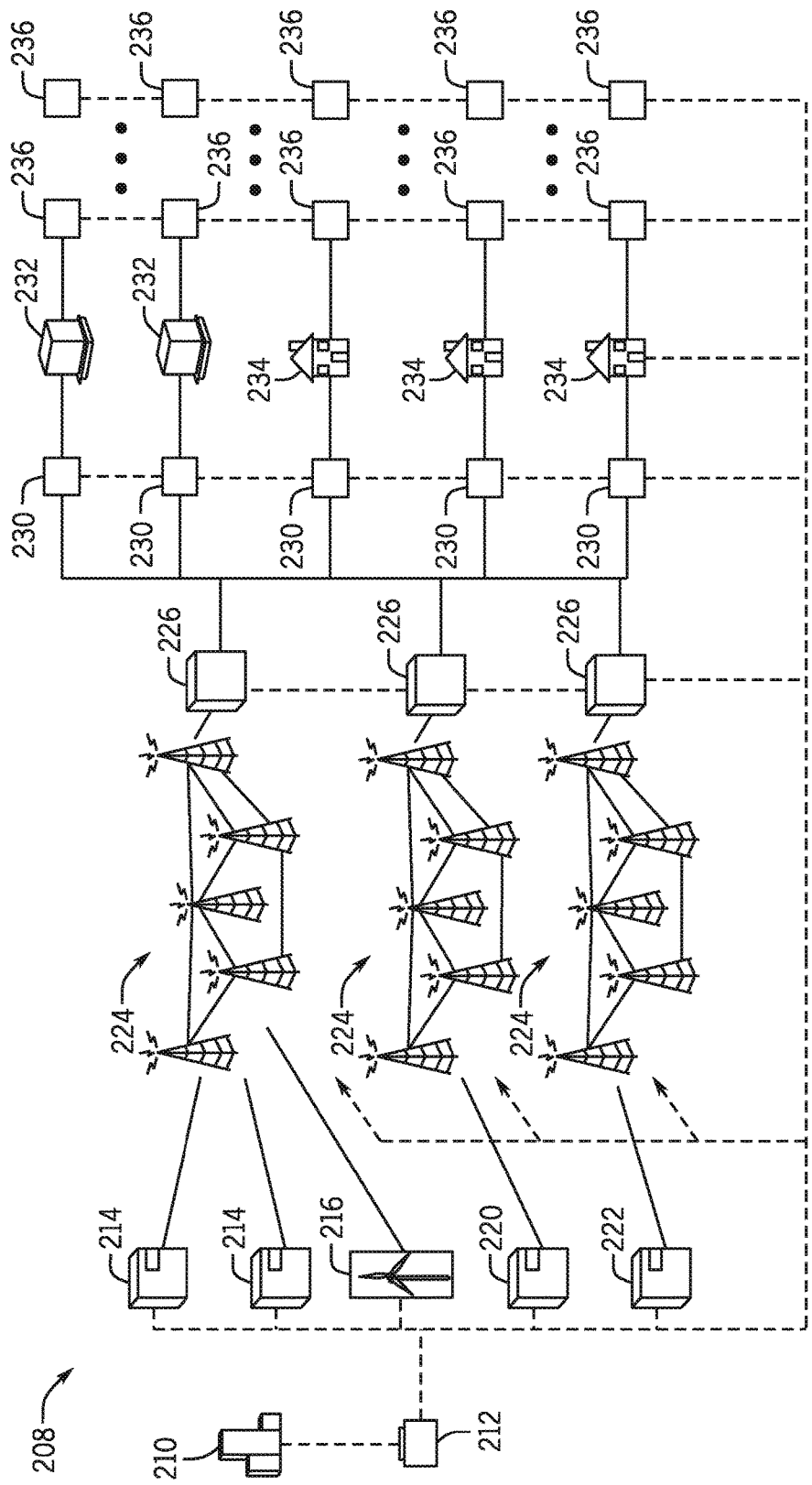
FIG. 3 Illustrates an embodiment of a power distribution grid that may be modeled by the PDMSS of FIG. 1.

Any one or more of the systems in the IGCC power plant 100 shown, as well as certain equipment not shown, such as valves, pumps, positioners, actuators, sensors, control systems, and the like may be modeled via the PPMSS 8 and/or the model 20. Likewise, FIG. 3 depicts and embodiment of a system, such as a power grid 208, that may be modeled by the PDMSS 10 and/or the model 22.

The power grid 208 may include one or more utilities 210. The utility 210 may provide for power production and oversight operations of the power grid system 208. Utility control centers 212 may monitor and direct power produced by one or more power generation stations 214 and wind power systems 216. The power generation stations 214 may include conventional power generation stations, such as power generation stations using gas, coal, biomass, and other carbonaceous products for fuel. The power generation stations 214 may additionally include alternative power generation stations using solar power, hydroelectric power, geothermal power, and other alternative sources of power (e.g., renewable energy) to produce electricity. For example, other infrastructure components may include a water power producing plant 220 and geothermal power producing plant 222. Water power producing plants 220 may provide for hydroelectric power generation, and geothermal power producing plants 222 may provide for geothermal power generation.

The power generated by the power generation stations 214, 216, 220, and 222 may be transmitted through one or more power transmission grids 224. A power transmission grid 224 may cover a broad geographic region or regions, such as one or more municipalities, states, or countries. The transmission grid 224 may also be a single phase alternating current (AC) system, but most generally may be a three-phase AC current system. As depicted, the power transmission grid 224 may include a series of towers to support a series of overhead electrical conductors in various configurations. For example, extreme high voltage (EHV) conductors may be arranged in a three conductor bundle, having a conductor for each of three phases. The power transmission grid 224 may support nominal system voltages in the ranges of 110 kilovolts (kV) to 765 kilovolts (kV). In the depicted embodiment, the power transmission grid 24 may be electrically coupled to distribution systems (e.g., power distribution substations 226). A power distribution substation 226 may include transformers to transform the voltage of the incoming power from a transmission voltage (e.g., 765 kV, 500 kV, 345 kV, or 138 kV) to primary (e.g., 13.8 kV or 4160V) and secondary (e.g., 480V, 230V, or 120V) distribution voltages.

Advanced metering infrastructure meters (e.g., smart meters) 230 may be used to monitor and communicate power related information based on electric power delivered to commercial consumers 232 and residential consumers 234. For example, the smart meters 230 may include two-way communications with the grid system 208 and the utilities 210 suitable for communicating a variety of information, including power usage, tampering, power outage notification, power quality monitoring, and the like. The smart meters 230 may additionally receive information, for example, demand response actions, time-of-use pricing information, remote service disconnects, and the like.

The customers 232, 234 may operate a variety of power consuming devices 236, such as household appliances, industrial machinery, communications equipment, and the like. In certain embodiments, the power consuming devices 236 may be communicatively coupled to the grid system 208, the utilities 210, and/or the meters 230. For example, the power consuming devices 236 may include switches that may be actuated remotely to turn on/off the devices 236 and/or to vary power consumption (e.g., lower or raise heating ventilation and air conditioning [HVAC] temperature set points). The smart meters 230 and the power consuming devices 236 may be communicatively coupled, for example, through a home area network (HAN), (for residential customers 234), wireless area network (WAN), powerline network, local area network (LAN), mesh network and the like. As mentioned above, power produced by the power generation systems 214, 216, 220, and/or 222 may be modeled via the model 20 and/or the PPMSS 8. The remainder of the system 208, and more specifically, the grid 224, may be modeled via the model 22 and/or the PDMSS 10. It is to be noted that in certain embodiments the model 22 models the electrical components or portions of the power plant 100, such as turbine 126, HRSG 139, electrical generators, electrical motors, auxiliary transformers, step up transformers, and the like, in addition to system 208. Accordingly, as a simulation that includes the models 20 and 22 is executed, the simulation integration system 12 may be used to perform time synchronization, data exchanges, execution invocation, and so on, as described in more detail below.

Figure 4:
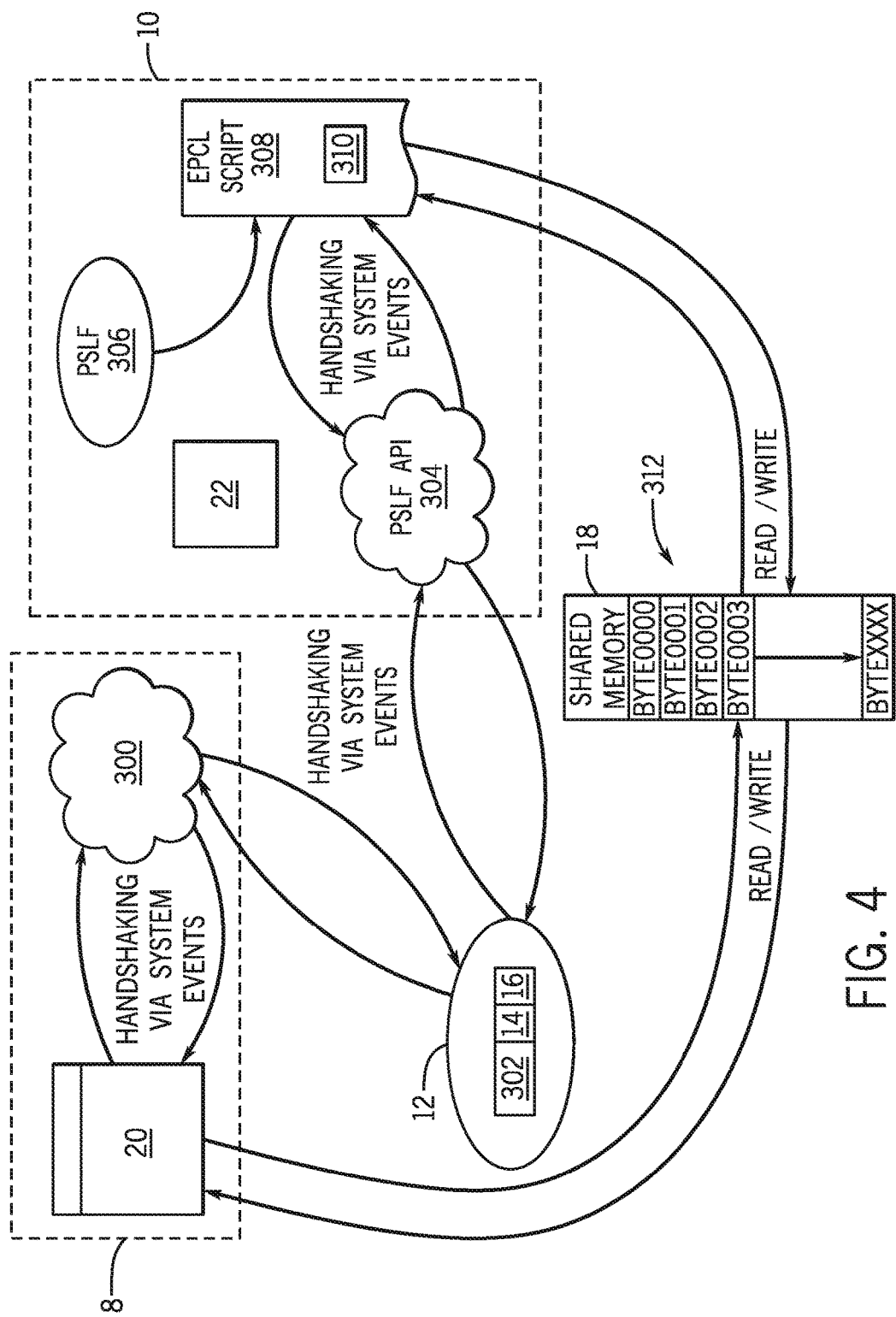
FIG. 4 illustrates an embodiment of certain information flow and processing synchronization that may be implemented between the PPMSS and the PDMSS of FIG. 1, via the simulation integration system using shared memory.

FIG. 4 illustrates an embodiment of certain information flow and processing synchronization that may be implemented between the PPMSS 8 and the PDMSS 10 via the simulation integration system 12 and using the shared memory 18. In the depicted embodiment the model 20 may be created to simulate a power production system, such as the system 100 described in FIG. 2. In addition to implementing objects representative of the various components of the system 100, and simulating said objects, the model 20 may additionally execute the API described by or otherwise included in the library system 14 and encoded in the DLL 16. In operations, the model 20 may interact (e.g., handshake) with certain PPMSS 8 internals 300 to simulate the system modeled, such as the system 100. For example, the internals 300 may provide for input/output registration services, command and control services (e.g., step simulation, pause simulation, stop simulation, and so on), and IC data management (e.g., save/restore). In certain embodiments, the model 20 may interact with the internals 300 via system events, such as operating system (OS) events. For example, the models 20, 22 may signal each other via certain events. In certain embodiments, custom events, such as a PSLF_CYCLE_COMMAND and a PSLF_CYCLE_COMPLETE may be used for signaling. That is, the models 20, 22 may raise the aforementioned events, as well as listen to the events raised. The presence of the events being raised may lead to certain processing logic, described in more detail below. Additionally or alternatively, the OS may additionally or alternatively trigger events based on user input, program logic, status or activity of certain systems (e.g., shared memory 18 status, filesystem status), and so on.

As the model 20 executes its simulation supported by the internals 300, the model 20 may act as a master control for the PDMSS 10 and/or the model 22. More specifically, the model 20 may interact with the internals 300 which in turn may interface with the simulation integration system 12 to control the PDMSS 10 and/or the model 22. As mentioned above, the simulation integration system 12 may include an API 302 that may be described via the library 14 and implemented in the DLL 16. By using the API 302, the internals 300 and/or model 20, as well as the PPMS may establish the shared memory 18, synchronize both simulation systems PPMSS 8 and PDMSS 10 (including models 20, 22), provide for command and control services (e.g., step simulation, pause simulation, stop simulation, and so on), and IC data management (e.g., save, restore). In the depicted embodiment, the simulation integration system 12 may also use system events as described above, to handshake or otherwise interface, for example, with the internals 300 (and thus the model 20) and a PSLF API 304 (and thus the model 22).

The PSLF API 304 may provide for services including I/O registration, command and control services, (e.g., step simulation, pause simulation, stop simulation, and so on), and IC data management (e.g., save, restore), for example, to the model 22. PSLF internals 306 may additionally provide for services that map I/O to the shared memory 18, for example, to enable data exchange via the shared memory 18. The PSLF internals 306 may additionally map command and control services (e.g., step simulation, pause simulation, stop simulation, heartbeat, and so on). Also shown is an EPCL Script system 308. The EPCL Script system 308 may include program script(s) or executable computer code 310 to be executed by the PDMSS 10. The EPCL script system 308 can be used to develop customized user defined transient models of electrical controls in the power plant. It can also be used to execute PSLF 306. Indeed, the script(s) 310 may execute the PSLF API 304 to support execution of the model 22, and in some cases, to fully execute the model 22. The EPCL Script system 308 may interact with the PSLF API 304, for example, by handshaking via system events. The EPCL Script system 308 may support a scripting or interpreted language, such as EPCL.

In the depicted embodiment, the model 20 acts as a master to control execution of the model 22. For example, the model 20 may execute at a lower frequency (e.g., 4 ms), while the model 22 may execute at a higher frequency (e.g., 2 ms). Model 22 execution refers to the integration of simulation time (e.g., simulating objects and sub-objects for a specified time period) by a prescribed or pre-configured integration time step. In one embodiment, model 22 execution includes reading inputs, solving state and algebraic equations, and writing outputs. The inputs and outputs may include data stored in bytes 312 of the shared memory system 18. Because the model 22 has a smaller time step for numerical integration, the model 22 will run at a higher frequency until simulation time for that cycle equates to an integration time step for the model 20. At that time, control is relinquished to Model 20 to complete another cycle. During the model 20 cycle, inputs may be read from the shared memory system 18 that may have been written previously by the model 22, state and algebraic equations may be solved by the model 20, and the model 20 may write outputs to the memory system 18. Then control is relinquished to model 22, and so on. By this interplay of execution between model 20 and model 22 as mediated by the simulation integration system 12, model 20, 22 execution may be synchronized and a more efficient and comprehensive simulation, for example, of systems 100 and 200 may be provided. Further, by using the shared memory system 18, the techniques herein do not depend on special hardware, e.g. reflective memory (RFM), to facilitate interprocess communication and time synchronization.

Figure 5:
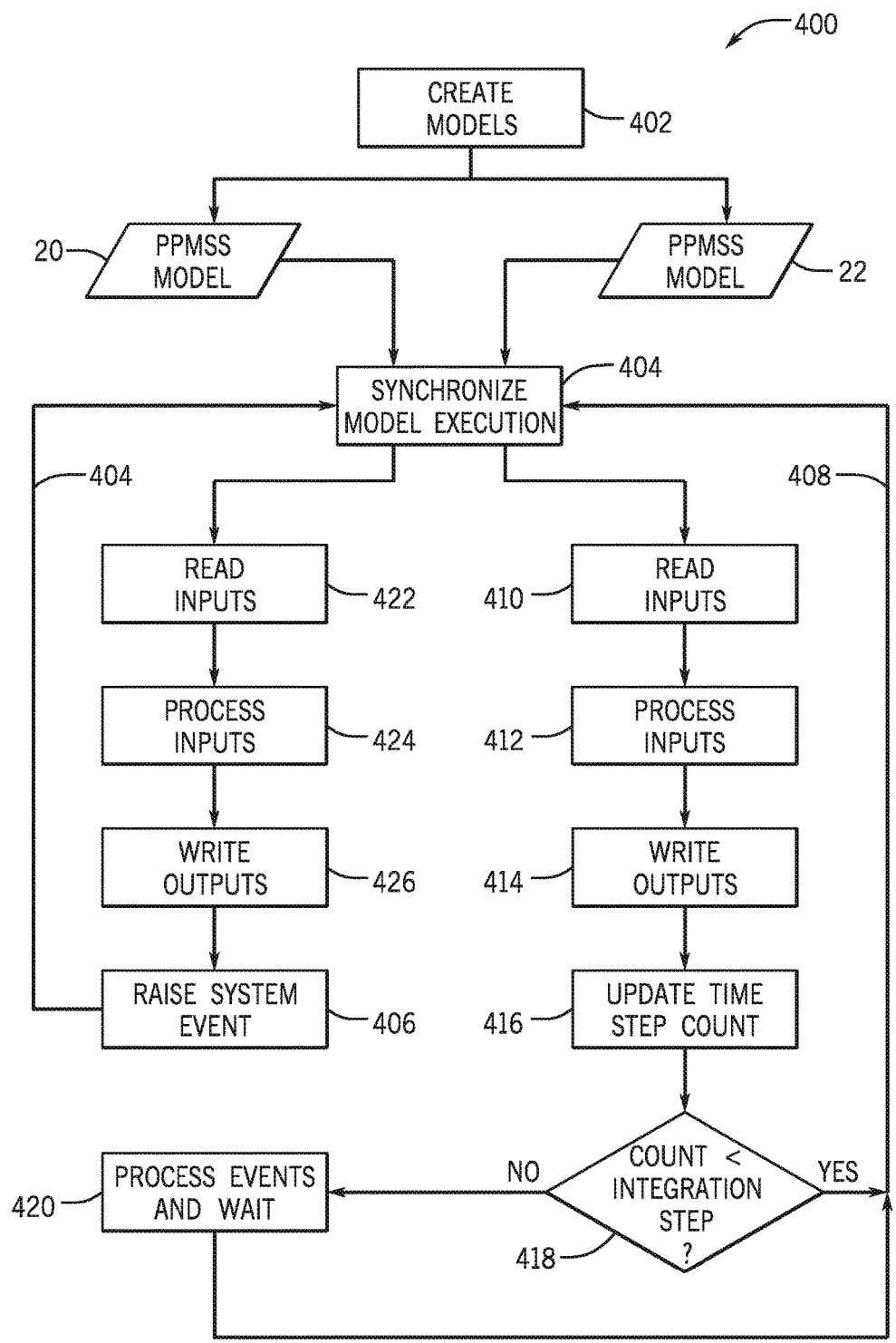
FIG. 5 shows and embodiment of a process suitable for modeling and synchronizing execution of PPMSS models with PDMSS models.

FIG. 5 depicts an embodiment of a process 400 suitable for modeling and synchronizing execution of PPMSS 8 models with PDMSS 10 models. The process 400 may be implemented as computer executable code or instructions executable by the processor(s) 24 and stored in the memory 26. In the depicted embodiment, the process 400 may create (block 402) one or more models. For example, the PPMSS 8 may include authoring tools useful in creating the PPMSS model 20. Likewise, the PDMSS 10 may include authoring tools useful in creating the PDMSS model 22. The process 400 may then synchronize (block 404) execution of the models 20, 22.

In one embodiment, the models 20 and 22 may be synchronized via the simulation integration system 12. For example, model 20 may control execution of model 22 via the API 302. More specifically, when the model 20 has completed one integration time step 404, the process 400 may raise (block 406) a system event, such as the PSLF_CYCLE_COMMAND event. The raising (block 406) of the system event may then signal the PDMSS 10 to use the model 22 to execute a predetermined number of time steps in a cycle 408. In one embodiment, a total time to execute the predetermined number of time steps take equal time to a total time taken to execute one integration time step of the model 20.

During execution of the predetermined time steps (e.g., cycle 408), the model 22 may read inputs (block 410). Certain of the inputs read may be stored in the shared memory system 18. Reading may include using certain locks (e.g., mutex locks) to provide for data that is not overwritten by other process, for example, during the read. The model 22 may then process (block 410) the inputs. Processing the inputs (block 412) may include computing certain model equations, model logic, execution of sub-processes, solving states, and so on. The model 22 may then write (block 414) certain outputs. Some of the outputs may be written into the shared memory system 18. The write operation may additionally use locks (e.g., mutex locks) to provide for data integrity during the write operation. As mentioned earlier, the cycle 408 of reading (block 410), processing (block 412) and writing (block 414), may be faster than the cycle 404 of the model 20. Indeed, because the model 22 has a smaller time step for numerical integration, the model 22 will run at a higher frequency until simulation time for that cycle 408 equates to an integration time step (e.g., one cycle 404) for the model 20. At that time, control is relinquished to model 20 to complete another cycle 404.

Accordingly, the process 400 may keep track or otherwise update (block 416) of a number of currently executed time steps and determine (decision 418) if the current time step count adds to a total time less than the model 20's integration step (e.g., total time in time steps is less than cycle 404). If yes (decision 418), then the model 22 may execute another cycle 408. If no (decision 418), then the process 400 may then process certain system events and wait (block 420). More specifically the process 400 may set the PSLF_CYCLE_COMMAND event to a non-signaled state, and also set the PSLF_CYCLE_COMPLETE event to a signaled state. The PDMSS 10 may then wait until the PSLF_CYCLE_COMMAND event is signaled, and continue execution synchronization via blocks 404, 410, 412, 414, and 416.

When the process 400 detects the PSLF_CYCLE_COMPLETE event, the process 400 may complete another cycle 404 of simulation via the model 20. As shown, the model 20 may read inputs (block 422). Certain of the inputs read may be stored in the shared memory system 18. Reading may include using certain locks (e.g., mutex locks) to provide for data that is not overwritten by other process, for example, during the read. The model 20 may then process (block 424) the inputs. Processing the inputs (block 424) may include computing certain model equations, model logic, execution of sub-processes, solving states, and so on. The model 20 may then write (block 426) certain outputs. As mentioned above, the process 400 may provide for time synchronization, data exchanges, and execution invocation. For example, by using the API 302, the model 20 may control execution of the model 22 and the simulation integration system 12 may be used to synchronize cycles 408 and 404 to enable reads and writes between the models 20 and 22 to occur in an ordered and more efficient fashion.

Technical effects of the invention include integrating a power production modeling and simulation system (PPMSS) model with a power distribution modeling and simulation system (PDMSS) model via time synchronization, data exchanges, and execution invocation. In certain embodiments, data may be exchanged via a shared memory system, thus removing the need for specialized hardware such as reflective memory (RFM). The PPMSS model may act as a master in control of the PDMSS model, for example, via a simulation integration system. The simulation integration system may provide for an API suitable for control model invocation, input/output registration services, command and control services (e.g., step simulation, pause simulation, stop simulation, and so on), and IC data management (e.g., save/restore). The PDMSS model may include a faster execution time per simulation cycle as compared to the PPMSS model. Accordingly, the PDMSS model will run at a higher frequency until simulation time for that execution cycle equates to an integration time step for the PPMSS model, at which time control is relinquished to PPMSS to complete another cycle. By providing for time synchronization, data exchanges, and execution invocation, the techniques described herein may enable simulations that improve fidelity, efficiency, and reduce overall simulation time.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising;
a processor configured to execute:
a simulation integration system configured to provide for time synchronization between execution of a power production modeling and simulation system (PPMSS) model and a power distribution modeling and simulation system (PDMSS) model, wherein the PPMSS model comprises a power production system simulation, wherein the PDMSS model comprises a power distribution system simulation, wherein the PPMSS model is configured to provide for a master control of the PDMSS model, wherein the PDMSS model is configured to execute at a higher frequency compared to the PPMSS model until a simulation time for a PDMSS model execution cycle is equal to an integration time step for the PPMSS model, and wherein the simulation integration system is configured to relinquish control to the PPMSS model to begin completion of another PPMSS model simulation cycle when the simulation time is equal to the integration time step.

2. The system of claim 1, wherein the PPMSS model is configured to invoke execution of the PDMSS model via a system event.

3. The system of claim 1, comprising a PDMSS having the PDMSS model, wherein the PDMSS comprises a Positive Sequence Load Flow (PSLF) analysis, wherein the PSLF analysis comprises evaluating an electrical network using a Newton-Raphson technique.

4. The system of claim 1, comprising a shared memory system, wherein the PPMSS model and the PDMSS model are configured to exchange data via the shared memory system.

5. The system of claim 4, wherein the PDMSS model exchanges the data via a script system that includes a script language.

6. The system of claim 1, wherein the PPMSS model and the PDMSS model communicate with the simulation integration system via system events.

7. The system of claim 1, wherein the PPMSS model comprises a gas turbine simulation, an integrated gasification combined cycle (IGCC) plant simulation, or a combination thereof.

8. A method, comprising:
executing, via a processor, a simulation integration system configured to provide for time synchronization between execution of a power production modeling and simulation system (PPMSS) model and a power distribution modeling and simulation system (PDMSS) model, wherein the PPMSS model comprises a power production system simulation wherein the PDMSS model comprises a power distribution system simulation, wherein the PPMSS model comprises a gas turbine simulation, an integrated gasification combined cycle (IGCC) plant simulation, or a combination thereof producing a gas turbine electric power, and wherein the PDMSS model simulates the power distribution of the gas turbine electric power produced, wherein the PPMSS model is configured to provide for a master control of the PDMSS model, wherein the PDMSS model is configured to execute at a higher frequency compared to the PPMSS model until a simulation time for a PDMSS model execution cycle is equal to an integration time step for the PPMSS model, and wherein the simulation integration system is configured to relinquish control to the PPMSS model to begin completion of another PPMSS model simulation cycle when the simulation time is equal to the integration time step.

9. The method of claim 8, wherein the PPMSS model is configured to invoke execution of the PDMSS model via a system event.

10. A tangible, non-transitory, computer-readable medium comprising instructions that when executed by a processor cause the processor to:

execute a simulation integration system configured to provide for time synchronization between execution of a power production modeling and simulation system (PPMSS) model and a power distribution modeling and simulation system (PDMSS) model, wherein the PPMSS model comprises a power production system simulation and wherein the PDMSS model comprises a power distribution system simulation, wherein the PPMSS model comprises a gas turbine simulation, an integrated gasification combined cycle (IGCC) plant simulation, or a combination thereof producing a gas turbine electric power, and wherein the PDMSS model simulates the power distribution of the gas turbine electric power produced, wherein the PPMSS model comprises a gas turbine simulation, an integrated gasification combined cycle (IGCC) plant simulation, or a combination thereof producing a gas turbine electric power, and wherein the PDMSS model simulates the power distribution of the gas turbine electric power produced, wherein the PPMSS model is configured to provide for a master control of the PDMSS model, wherein the PDMSS model is configured to execute at a higher frequency compared to the PPMSS model until a simulation time for a PDMSS model execution cycle is equal to an integration time step for the PPMSS model, and wherein the simulation integration system is configured to relinquish control to the PPMSS model to begin completion of another PPMSS model simulation cycle when the simulation time is equal to the integration time step.

11. The tangible, non-transitory, computer-readable medium of claim 10, wherein the PDMSS model comprises a Positive Sequence Load Flow (PSLF) analysis, wherein the PSLF analysis comprises evaluating an electrical network using a Newton-Raphson technique, differential algebraic equations, or a combination thereof.

* * * * *